Patented May 13, 1930

1,758,528

UNITED STATES PATENT OFFICE

WERNER MECKLENBURG, OF MOSCOW, UNION OF SOVIET SOCIALIST REPUBLICS

PRODUCTION OF TITANIUM DIOXIDE REISSUED

No Drawing. Application filed February 1, 1929, Serial No. 336,918, and in Czechoslovakia May 5, 1928.

This invention relates to a process for the production of titanium dioxide by the hydrolysis of titanium salt solutions.

When titanium salt solutions such as the sulfate or chloride are heated to a temperature near the boiling point, hydrolysis occurs and a precipitate of $TiO_2$ is formed. At the same time, the acidity of the mother liquor is increased on account of the formation of additional free acid.

Dilute solutions of hydrolyzable titanium salts such as the sulfate or chloride are more easily hydrolyzed than concentrated solutions, but at the same time the economical production of titanium dioxide by this process requires the use of fairly concentrated salt solutions since, otherwise, the free acid obtained as a byproduct is too dilute to permit recovery and reconcentration.

In previously developed hydrolysis processes various plans have been advanced for conducting the operation in concentrated solutions. For example, hydrolysis has been effected by boiling the solutions at atmospheric pressure, in vacuo, and at elevated pressure. In other processes, hydrolysis has been accomplished by diluting a hot very concentrated solution with water or with mother liquor from previous hydrolyses.

Whenever titanium salt solutions are subjected to hydrolysis, a certain "lag" or induction period is observed between the commencement of the operation and the first visible precipitation, and it is believed that during this induction period, colloidal particles of $TiO_2$, are formed in the solution; which particles serve as centers for the accumulation of additional hydrolyzed particles and result in the formation of aggregates which produce a visible precipitate. In view of this explanation of the hydrolysis reaction, one might expect that the addition of $TiO_2$ produced by hydrolysis to a solution to be hydrolyzed would hasten the reaction. It has been found, however, that $TiO_2$—produced by the ordinary hydrolysis reaction, whether colloidal or not—does not produce the desired seeding action.

We have now discovered a process for preparing a special form of titaniferous material which, when added to a concentrated heated titanium salt solution such as the sulfate or the tetrachloride will produce a rapid and complete hydrolysis. One aspect of the invention deals with the production of this special material, hereinafter called "seed suspension". Another aspect of the invention relates to the use of said suspensions in the hydrolysis process.

By neutralizing a titanium solution, such as is used for hydrolysis, with sodium hydroxide, using methyl orange or bromphenol blue as an indicator, an aqueous mixture comprising a sodium salt solution and a suspension of titanium hydroxide is formed. If this mixture is maintained at an elevated temperature, in the neighborhood of 100° C., for a few minutes, some change in properties, not well understood, occurs and the resultant material may be used as a seed suspension for hydrolysis.

If a small amount of such a seed supenion is added to a hydrolyzable titanium solution, the mixture will appear turbid unless or until the temperature of the mixture is raised above 50-60° C. At about this temperature the turbidity disappears, the titanium hydroxide apparently dissolving in the solution. If the titanium solution, thus seeded, is maintained at about 100–105° C. for three hours, the titanium content is almost entirely precipitated as $TiO_2$, the yield of this material being in excess of 95%. Under the same conditions, an unseeded solution yields no more than 35–70% of $TiO_2$. As little as 1% of seed (based on the weight of seed $TiO_2$ as compared to precipitated $TiO_2$) is sufficient to produce the desired result. The seed suspension, once prepared, does not deteriorate even after months of standing.

The advantages of this method of hydrolysis over others known in the art are obvious. By means of this improvement, it is possible to completely hydrolyze concentrated titanium solutions without long hours of boiling (which invariably produces a relatively poor result), without treatment under pressure, and without diluting the solution to be treated with either water or mother liquor from a previous hydrolysis.

Now, having generally described the invention, specific illustrations of its use will be given. To conduct the hydrolysis it is first necessary to prepare the seed suspension. This is accomplished by combining sufficient normal alkali hydroxide with (for example) a titanium sulfate solution to reduce the hydrogen-ion concentration to a point within the range pH4 to pH4.5. Within this range, the titanium hydroxide is largely precipitated to form a suspension within the alkali sulfate solution formed as a by-product of the reaction.

When the requisite proportions of titanium sulfate solution and normal alkali hydroxide solution have been determined, the seed suspension is prepared by stirring the two materials together at a temperature of about 74°–80° C. This mixture is then maintained at a temperature of about 80° C. for from fifteen to thirty minutes. At the end of this treatment, the resultant seed suspension may be used for the hydrolysis of titanium sulfate solution or it may be set aside for future use. If the material is not to be used immediately, the temperature should be promptly reduced to below 60° C. at the end of the heat treatment. This may conveniently be accomplished by adding an equal volume of cold water. Thus treated, the seed suspension is converted to a stable form and may be stored for months without deterioration.

While a convenient method of producing the seed suspension has been described, it should be understood that this example is merely illustrative and is by no means limiting. A suitable material may be prepared by other methods, the only requisite items being that the titanium sulfate solution be reduced to the proper hydrogen-ion concentration and that the resultant material be heat-treated at 80–100° C. for 15–30 minutes. In place of an alkali hydroxide such as the hydroxide of sodium, potassium, or ammonium, the alkaline carbonates may be employed to reduce the hydrogen-ion concentration of the titanium sulfate solution to the proper point.

When the seed suspension is introduced into cold titanium sulfate solution, no reaction of any sort is apparent. If it is introduced into a hot solution, the suspended titanium hydroxide apparently dissolves and the mixture is not turbid. If the seeded titanium sulfate solution is maintained at 100–105° C. (this being slightly below the boiling point) for about three hours, the titanium is completely hydrolyzed to form $TiO_2$, the yield being in excess of 95%, and sometimes as high as 98%. The $TiO_2$ thus produced may be removed by filtration and the mother liquor may be concentrated and used again for the treatment of ore, or for other purposes.

The amount of seed suspension used to promote hydrolysis may be varied as desired. As little as 1% of $TiO_2$ in the seed solution as compared to the $TiO_2$ in the titanium sulfate solution gives satisfactory results. More may be used, but the addition of a greater quantity dilutes the mother liquor which it is desired to reconcentrate. In practice, the titanium hydroxide in the seed solution may be allowed to settle and some of the clear liquor (containing soluble sulfates) may be decanted off. The more concentrated seed solution may then be employed in proportionate quantity.

As illustrative of the results obtained by my improved method of hydrolysis, the following table of data obtained with certain variations of the process is submitted. In all of the cases mentioned, 400 cc. of titanium sulfate solution were mixed with 45 cc. of seed suspension and the mixture was maintained at a temperature near the boiling point for three hours.

| Titanium sulfate sol., grams per liter | | Seed suspension | | | Hydrolysis yield of $TiO_2$ | | |
|---|---|---|---|---|---|---|---|
| $TiO_2$ | $H_2SO_4$ | Age | Alkali | pH value | 1 hr. | 2 hrs. | 3 hrs. |
| | | Hrs. | | | Per cent | Per cent | Per cent |
| 200 | 438 | 24 | NaOH | 2.7 | 87.6 | 93.2 | 95.2 |
| 200 | 440 | 30 | NaOH | 3.7 | 90.6 | 94.5 | 96.1 |
| 210 | 460 | 0 | NaOH | 4.5 | 93.2 | 94.3 | -------- |
| 213 | 488 | 0 | KOH | 2.8 | -------- | 95.0 | -------- |
| 208 | 502 | 72 | KOH | 2.8 | -------- | -------- | 96.8 |
| 185 | 465 | 0 | KOH | 3.2 | -------- | 94.0 | -------- |
| 200 | 440 | 0 | $NH_4OH$ | 4.3 | 95.8 | 98.0 | -------- |
| 200 | 456 | 48 | $NH_4OH$ | 4.4 | 91.2 | 95.9 | -------- |

As previously indicated, the advantages to be gained by the improved hydrolysis process depend in part on the economic improvement afforded by operating with concentrated solutions. However, the invention is equally applicable and operative in the case of dilute solutions.

While we prefer to use seed suspensions at a hydrogen-ion concentration of about 4–4.5 as previously specified, our invention is capable of a wider use, as is shown in the above tabulation. In working with suspensions of greater acidity than pH 4—e. g. 2.5–4.0 as shown in the tabulation—great care must be exercised to cool the seed suspension to 60° C. immediately after the formation reaction and the period of heating should be short—i. e. about fifteen minutes. On the other hand, seed suspensions may be prepared at a hydrogen-ion concentration of pH 4.5–6.0 by slightly increasing the duration and temperature of heating.

From the character of the "seed", which is actually a suspension of titanium hydroxide produced at a point near neutrality and from the behavior of the seed suspension when added to the solution to be hydrolyzed, it appears probable that the titanium hydroxide is not actually dissolved on heating but is converted to some colloidal form which promotes the hydrolysis of titanium sulfate solutions. However, the result attained differs from other hydrolysis processes which are apparently promoted by the formation of colloidal particles prior to actual precipitation in at least two important respects:

(a) The quantity of promotion material is much smaller;

(b) The desired result is attained without diluting the solution.

While the explanation given appears reasonable, any and all theories and explanations of the process are disclaimed.

Now, having described my invention, I claim:

1. A composition comprising titanium hydroxide in aqueous suspension at a hydrogen-ion concentration of about pH 2.5–6.0.

2. A composition comprising titanium hydroxide suspended in an aqueous sulfate solution at a hydrogen-ion concentration of about pH 2.5–6.0.

3. A composition comprising titanium hydroxide suspended in an aqueous sodium sulfate solution at a hydrogen-ion concentration of about pH 2.5–6.0.

4. In a process for preparing a seed suspension the step which comprises reducing the acidity of a titanium salt solution to a hydrogen-ion concentration of pH 2.5–6.0.

5. In a process for preparing a seed suspension the step which comprises adding sufficient alkali to titanium sulfate solution to precipitate titanium hydroxide and reduce the acidity of the solution to a hydrogen-ion concentration of about pH 2.5–6.0.

6. A process for preparing a seed suspension which comprises reducing the acidity of titanium sulfate solution to a hydrogen-ion concentration of about 2.5–6.0, and heating the mixture to about 80° C. for 15–30 minutes.

7. A process for preparing a seed suspension which comprises reducing the acidity of titanium sulfate solution to a hydrogen-ion concentration of about pH 2.5–6.0, heating the mixture to about 80° C. for 15–30 minutes, and cooling said mixture.

8. A process for preparing a seed suspension which comprises adding sufficient alkali to titanium sulfate solution to precipitate titanium hydroxide and to reduce the acidity of the mixture to a hydrogen-ion concentration of pH 2.5–6.0, and heating the mixture to about 80° C. for 15–30 minutes.

9. A process for preparing a seed suspension which comprises adding sufficient sodium hydroxide to titanium sulfate solution to precipitate titanium hydroxide and to reduce the acidity of the mixture to a hydrogen-ion concentration of about pH 2.5–6.0, and heating the mixture to about 80° C. for 15–30 minutes.

10. A process for the production of titanium dioxide which comprises adding an aqueous suspension containing titanium hydroxide at hydrogen-ion concentration of about pH 2.5–6.0 to a solution of titanium sulfate, and maintaining the mixture at a temperature near the boiling point.

11. A process for the production of titanium dioxide which comprises adding a mixture containing titanium hydroxide in an aqueous sulfate suspension at a hydrogen-ion concentration of about pH 2.5–6.0 to a solution of titanium sulfate, and maintaining the mixture at a temperature near the boiling point.

12. A process for the production of titanium dioxide which comprises adding a mixture containing titanium hydroxide in aqueous suspension containing sodium sulfate to a solution of titanium sulfate, and maintaining the mixture at a temperature near the boiling point.

13. A process for the production of titanium dioxide which comprises adding about one part of titanium dioxide in the form of an aqueous suspension of titanium dioxide in a sulfate solution having a hydrogen-ion concentration of pH 2.5–6.0 to one hundred parts of titanium dioxide in the form of a sulfate solution, and maintaining the mixture at a temperature near the boiling point.

14. A process for the production of titanium dioxide which comprises adding about one part of titanium dioxide in the form of an aqueous suspension of titanium dioxide in a sulfate solution having a hydrogen-ion concentration of pH 2.5–6.0 to one hundred parts of titanium dioxide in the form of a sulfate solution containing about 180 grams per liter of $TiO_2$ and 400 grams per liter of titratable acid, and maintaining the mixture at a temperature near the boiling point.

15. A process for the hydrolysis of titanium sulfate solution which comprises adding sufficient alkali to a small portion of said solution to reduce the acidity of pH 2.5–6.0 and to precipitate titanium hydroxide therein, heating said mixture to about 80° C. for 15–30 minutes, adding said mixture to the rest of the titanium sulfate solution, and maintaining the mixture at a temperature near the boiling point.

16. A process for the hydrolysis of titanium sulfate solution which comprises adding titanium hydroxide suspended in an aqueous sulfate solution having a hydrogen-ion concentration of pH 2.5–6.0 to titanium sulfate solution, maintaining the mixture at a temperature near the boiling point for about three hours, removing the $TiO_2$ thus produced, and reconcentrating the sulfuric acid mother liquor.

17. A composition comprising titanium hydroxide in aqueous suspension at a hydrogen-ion concentration of about pH 2.5 to 4.5.

18. In a process for preparing seed suspension, the step which comprises reducing the acidity of a titanium salt solution to a hydrogen-ion concentration of pH 2.5 to 4.5.

19. A process for preparing a seed suspension which comprises reducing the acidity of a titanium salt solution to a hydrogen-ion concentration of pH 2.5 to 6.0 and cooling the mixture to below 60° C.

20. A process for the production of titanium dioxide which comprises adding an aqueous suspension containing titanium hydroxide at hydrogen-ion concentration of about pH 2.5 to 4.5 to a solution of titanium sulphate and maintaining the mixture at a temperature near the boiling point.

21. A process for the production of titanium dioxide which comprises mixing an aqueous suspension containing titanium hydroxide at a hydrogen-ion concentration of about pH 2.5 to 6.0 with a solution of titanium sulphate at a temperature below 50° C., heating the solution to near the boiling point and maintaining it at this temperature.

In testimony whereof, I have signed my name to this specification this 15th day of January, 1929.

WERNER MECKLENBURG.